(12) United States Patent
Snelgrove et al.

(10) Patent No.: US 8,818,209 B1
(45) Date of Patent: Aug. 26, 2014

(54) SYSTEM AND APPARATUS FOR DISTRIBUTING A SIGNAL TO THE FRONT END OF A MULTIPATH ANALOG TO DIGITAL CONVERTER

(75) Inventors: William Martin Snelgrove, Toronto (CA); Kim B. Roberts, Ottawa (CA); Bertram Leesti, Toronto (CA); Shahab Oveis Gharan, Ottawa (CA); Mahmoud Taherzadehboroujeni, Kanata (CA)

(73) Assignee: Ciena Corporation, Hanover, MD (US)

( * ) Notice: Subject to any disclaimer, the term of this patent is extended or adjusted under 35 U.S.C. 154(b) by 136 days.

(21) Appl. No.: 13/526,965

(22) Filed: Jun. 19, 2012

Related U.S. Application Data

(63) Continuation-in-part of application No. 13/159,871, filed on Jun. 14, 2011.

(51) Int. Cl.
   *H04B 10/06* (2006.01)
(52) U.S. Cl.
   USPC .......................................... 398/202; 398/208
(58) Field of Classification Search
   CPC ............. H04B 10/675; H04B 10/6164; H04B 10/6971; H04B 10/6973
   USPC ................... 398/202, 204, 208, 211
   See application file for complete search history.

(56) References Cited

U.S. PATENT DOCUMENTS

| | | | |
|---|---|---|---|
| 6,407,843 B1 * | 6/2002 | Rowan et al. ................. | 398/202 |
| 7,139,684 B2 | 11/2006 | Pupalaikis et al. | |
| 7,219,037 B2 | 5/2007 | Pupalaikis et al. | |
| 7,222,055 B2 | 5/2007 | Pupalaikis et al. | |
| 7,302,112 B2 * | 11/2007 | Shimazaki et al. .......... | 382/266 |
| 7,392,026 B2 * | 6/2008 | Alam et al. ................. | 455/180.1 |
| 7,574,135 B2 * | 8/2009 | Agazzi ........................... | 398/76 |
| 7,653,514 B2 | 1/2010 | Pupalaikis et al. | |
| 7,701,842 B2 | 4/2010 | Roberts et al. | |
| 7,957,938 B2 | 6/2011 | Lamarche et al. | |
| 8,073,656 B2 | 12/2011 | Pupalaikis et al. | |
| 2003/0088390 A1 * | 5/2003 | Jamsa et al. ..................... | 703/5 |
| 2010/0310256 A1 | 12/2010 | Shpantzer et al. | |
| 2011/0142457 A1 | 6/2011 | Betty et al. | |

OTHER PUBLICATIONS

J.K. Fischer, et al., "Digital Coherent Receiver Based on Parallel Optical Sampling" ECOC 2010, Sep. 19-23, 2010, Torino-Italy, IEEE, pp. 1-3.

Chao Zhang, et al., Demodulation of 1.28-Tbit/s Polarization-multiplexed 16-QAM Signals on a Single Carrier with Digital Coherent Receiver, OTuG3, 2009 OSA/OFC/NFOEC, 2009, IEEE, pp. 1-3.

* cited by examiner

*Primary Examiner* — Dalzid Singh
(74) *Attorney, Agent, or Firm* — Kent Daniels; Daniels IP Services Ltd

(57) ABSTRACT

A frequency decimation block for processing an analog input signal including a high-bandwidth data signal to generate a parallel set of parallel output signals, in which each output signal represents a respective portion of the high-bandwidth data signal. A preamplifier is provided for amplifying the input signal. A frequency domain divider divides the amplified input signal to generate a set of frequency band signals including a low frequency band signal, a mid-frequency band signal, and a high frequency band signal. Each frequency band signal is supplied to at least one signal path. A respective non-linear processor is connected in each of M signal paths processes the input signal using a respective branch signal to yield a corresponding composite signal. A respective Low-Pass Filter (LPF) is connected in each signal path, for low-pass filtering at least the composite signals to generate corresponding ones of the parallel output signals.

18 Claims, 3 Drawing Sheets

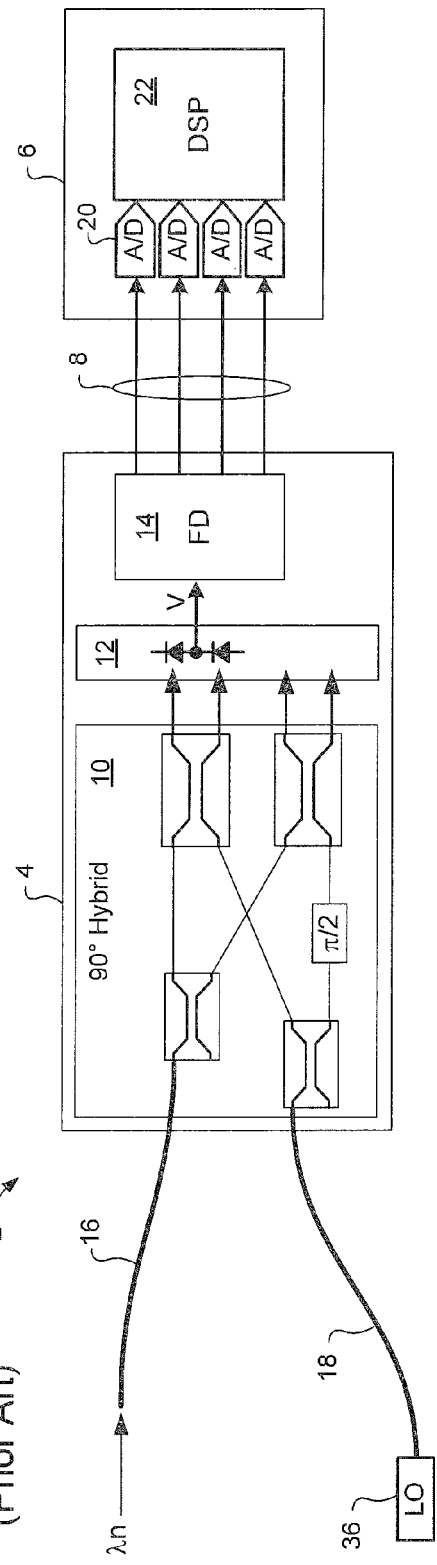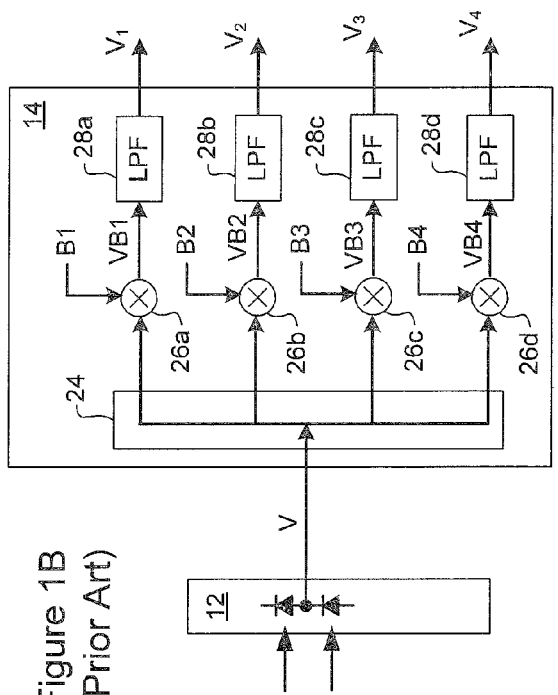
Figure 1A (Prior Art)
Figure 1B (Prior Art)

SYSTEM AND APPARATUS FOR DISTRIBUTING A SIGNAL TO THE FRONT END OF A MULTIPATH ANALOG TO DIGITAL CONVERTER

CROSS-REFERENCE TO RELATED APPLICATIONS

This application is a Continuation in Part of U.S. patent application Ser. No. 13/159,871 filed Jun. 14, 2011, the entire content of which is hereby incorporated by reference.

MICROFICHE APPENDIX

Not Applicable.

TECHNICAL FIELD

The present invention relates to optical communications networks, and in particular to parallel conversion between optical and digital signals in a coherent optical receiver.

BACKGROUND

Applicant's co-pending U.S. patent application Ser. No. 13/159,871, filed Jun. 14, 2011 teaches techniques for distributing a high-bandwidth analog signal to the front end of a multipath analog to digital converter. FIGS. 1A and 1B illustrate principle elements of a receiver module in accordance with U.S. patent application Ser. No. 13/159,871.

Referring to FIG. 1A, the receiver module 2 comprises an electro-optic IC 4 coupled to an electronic signal processor IC 6 via a parallel analog transmission line bus 8. The electro-optic IC 4 includes a 90° optical hybrid 10, a photodetector block 12, and an analog frequency decimation block 14. The optical hybrid 10 receives an incoming optical channel light and a local oscillator light through respective pigtails 16 and 18, and operates in a conventional manner to mix the two lights together to generate composite lights that are made incident on the photodetector block 12. Similarly, the photodetector block 12 operates in a conventional manner to generate an analog photodetector signal V that is proportional to the power of the incident composite light. The frequency decimation block 14 processes the photodetector signal to yield a set of parallel analog signals Vx (where x is an index value, x=1 . . . N) which, when taken together, contain all of the information content modulated on the photodetector signal V; but which, taken individually, have a lower bandwidth than the photodetector current V. The electronic signal processor IC 6 comprises analog signal conditioning circuits (such as power amplifiers, filters etc., not shown) and analog-to-digital (A/D) converters 20 for converting the analog electrical signals Vx from the frequency decimation block 14 into raw digital sample streams which are processed by the DSP 22 to reconstruct the spectrum of the photodetector signal V and recover digital data signals modulated on the received optical channel signal As is known in the art, a conventional 90° optical hybrid is configured to mix the received optical channel light with the LO light and a 90° phase-shifted version of the LO light, to generate corresponding In-Phase and Quadrature composite lights for each of two polarizations of the incoming optical channel light. In many practical embodiments, it is desirable to provide respective parallel signal paths (each comprising a photodetector 12 and an analog frequency decimation block 14) for receiving and processing each of these composite lights. However, for simplicity of illustration, only the In-Phase signal path for a single polarization is shown in FIG. 1A, it being understood that the signal path(s) for the corresponding Quadrature composite light, and for the second polarization (if any), could be provided by suitably duplicating the elements of the In-Phase signal path.

Referring to FIG. 1B, a representative frequency decimation block 14 comprises an analog 1:N power splitter 24, which receives the photodetector current V, and outputs a set of N parallel duplicates of the photodetector current V in a known manner. In the illustrated embodiment, N=4, but this is not essential. Increasing the number N of outputs reduces the bandwidth performance requirements of the analog transmission line bus 8, at the cost of increased complexity. For enhanced performance the splitter 24 may contain filtering and or preamplification functions which, for simplicity of illustration, are not shown in the drawings. Each output of the 1:N splitter 24 is connected to a respective analog signal path, each of which includes a respective non-linear processor 26a-d cascaded with a low-pass filter (LPF) 28a-d. Each non-linear processor 26 applies a non-linear operation to the photodetector current V using a respective branch signal Bx to yield a composite signal VBx that is supplied the LPF 28. The LPF 28 operates in a conventional manner to attenuate undesired high-frequency components to yield a low bandwidth analog signal Vx, which can be transmitted through the analog transmission line bus 8 to the electronic signal processing IC 6.

The non-linear processor 26 can be designed to implement any suitable non-linear operation. For example, in the embodiment of FIGS. 1A-1B, the non-linear processor 26 is implemented as a conventional Radio Frequency (RF) mixer, which operates to combine the photodetector current V and the respective branch signal Bx in a known manner. In an embodiment in which the branch signals Bx are continuous wave sinusoidal signals, the non-linear function is the well known heterodyne or homodyne function. In embodiments in which the branch signals Bx are binary digital signals, the non-linear function approximates a switching or sampling function, depending on the duty cycle of the branch signals Bx.

In the embodiment of FIGS. 1A-1B the N signal paths are supplied (driven) with a copy of the input signal V output from the power splitter 24 which, in practical implementations, will normally include a preamplifier stage (not shown). A typical preamplifier stage has undesirable characteristics, such as some combination of bandwidth limitation, excessive power consumption and excessive distortion, which are substantially aggravated by the requirement to drive multiple signal paths. The fundamental limitation is known to be one of gain-bandwidth product. For example, for a given preamplifier stage it is necessary to trade off bandwidth against power gain, and if, for example, two preamplifier stages are connected in series and need to be driven with a certain power level, then the bandwidth available will be reduced by a factor of approximately two.

It is known, for Walsh and frequency-domain architectures such as those illustrated in FIGS. 1A and 1B, to use a tree structure so that the number of preamplifier stages that must be driven can be reduced to as few as two, or often four.

It may appear that, in a time-interleaved system, it is only necessary for the preamplifier/power splitter 24 to drive one sampler (A/D converter) 20 at any given time, but in practice two design requirements combine to make the drive requirement equal to that for all N samplers 20 at once. One such design requirement is for sufficiently fast settling, in that each sampler 20 must settle completely at the full sample rate of the system, rather than that of an individual signal path.

Another requirement is for moderate duty cycles in switch-control waveforms, which may cause the designer to have several samplers 20 tracking and hence loading the preamplifier at any given time.

In Walsh and frequency-domain architectures in which all channels (signal paths) are driven directly, it is also known that at least some of the signal power supplied to the input of each channel will be rejected. For many practical classes of input signal, it is known that this unnecessary signal power adds distortion and increases requirements for power consumption in the individual channels.

These two design constraints pose problems because both run counter to the desire for high-speed performance.

Techniques that overcome limitations of the prior art remain highly desirable.

SUMMARY

An aspect of the present invention provides a frequency decimation block for processing an analog input signal including a high-bandwidth data signal to generate a parallel set of parallel output signals, in which each output signal represents a respective portion of the high-bandwidth data signal. A preamplifier is provided for amplifying the input signal. A triplexer frequency-divides the amplified input signal to generate a set of frequency band signals including at least a low frequency band signal, a mid-frequency band signal, and a high frequency band signal. Each frequency band signal is supplied to at least one signal path. A respective non-linear processor is connected in each of M signal paths, where M is an integer greater than zero and less that a total number of signal paths, for processing the input signal using a respective branch signal to yield a corresponding composite signal. A respective Low-Pass Filter (LPF) is connected in each signal path, for low-pass filtering at least the composite signals to generate corresponding ones of the parallel output signals

BRIEF DESCRIPTION OF THE DRAWINGS

Further features and advantages of the present invention will become apparent from the following detailed description, taken in combination with the appended drawings, in which:

FIGS. 1a and 1b are block diagrams schematically illustrating a receiver module known from U.S. patent application Ser. No. 13/159,871;

It will be noted that throughout the appended drawings, like features are identified by like reference numerals.

DETAILED DESCRIPTION

Figure 2:
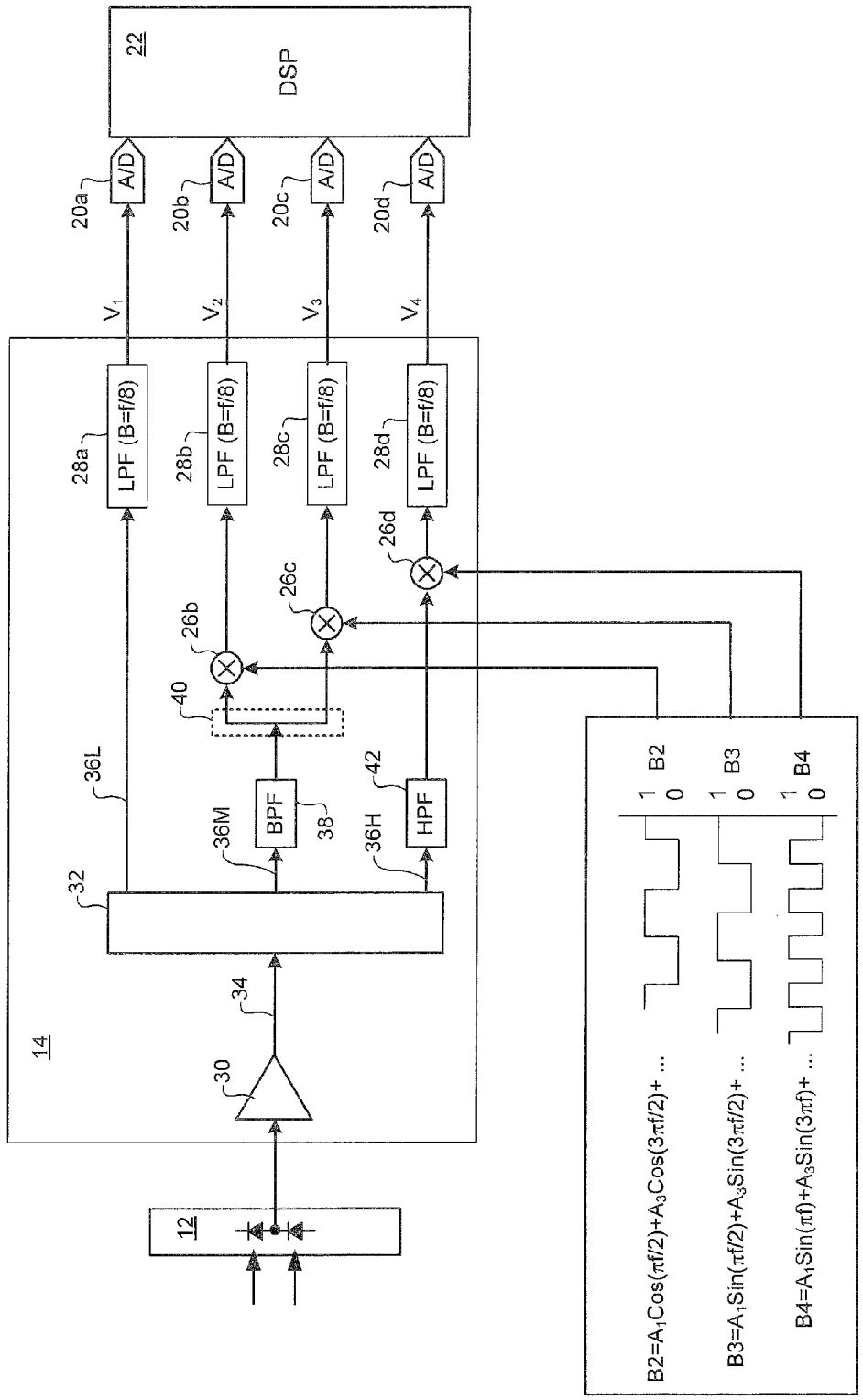
FIG. 2 is a block diagram schematically illustrating operation of a frequency decimation block.
Figure 3A:
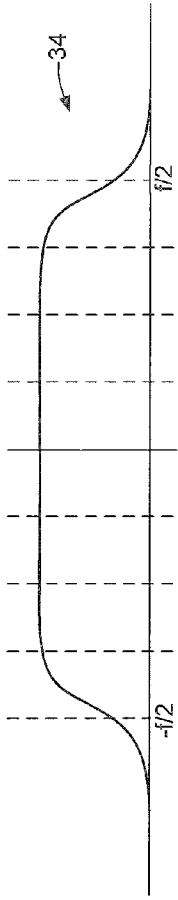
FIGS. 3A-3D are spectral diagrams illustrating operation of the triplexer of FIG. 2
Figure 3B:
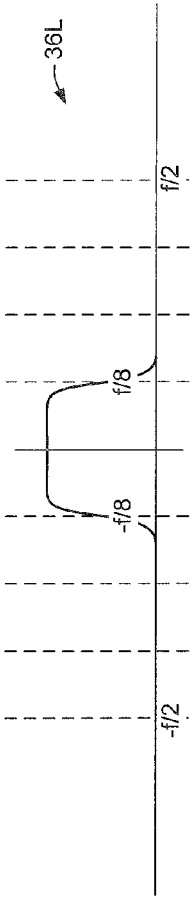
Figure 3C:
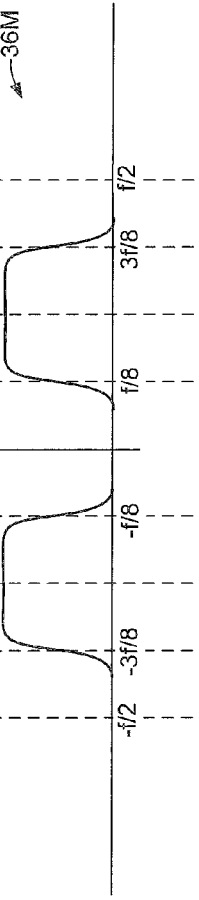
Figure 3D:
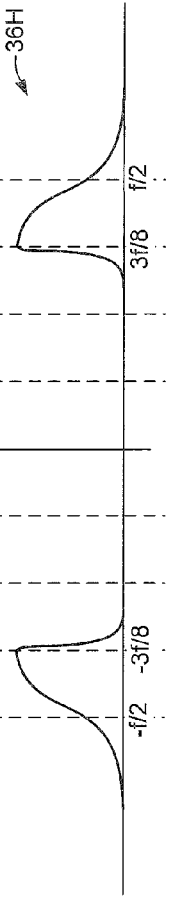

Referring to FIG. 2, there is shown a frequency decimation block 14 which includes a preamplifier 30 cascaded with a frequency domain divider 32. The preamplifier 30 operates to amplify the analog signal output from the photodetector block 12, and the frequency domain divider 32 divides the amplified photodetector signal 34 to produce a set of parallel frequency band signals 36. In the illustrated embodiment, the frequency-domain divider 32 is provided as a triplexer configured to divide the amplified analog signal 34 received from the preamplifier 30 into a set of three predetermined frequency band signals, namely: a low frequency band signal 36L; a mid-frequency band signal 36M; and a high frequency band signal 36H. FIGS. 3A-3D illustrate an embodiment in which the spectrum of the amplified analog signal 34 spans a frequency range between $-f/2$ and $+f/2$, as may be seen in FIG. 3A. In the illustrated embodiment, the frequency-domain divider 32 operates to divide the amplified analog signal into a low frequency band signal 36L encompassing frequencies lying below $+f/8$ as may be seen in FIG. 3B; a mid-frequency band signal 36M encompassing frequencies between $f/8$ and $3f/8$ as may be seen in FIG. 3C; and a high frequency band signal 36H encompassing frequencies lying above $3f/8$ as may be seen in FIG. 3D. Other frequency ranges may be used, if desired.

A key advantage of frequency-domain divider 32 is that, by performing a frequency-based division of the amplified photodetector signal 34, the load "seen" by the output of the preamplifier 30 is equivalent to only one signal path. This reduces the power requirement of the preamplifier 30 and also reduces noise introduced into the analog signal by the preamplifier 30.

In the embodiments of FIGS. 2 and 3, the low frequency band signal 36L is a baseband signal. This implies that a nonlinear processor 26a (FIG. 1B) in the low frequency band signal path would receive a DC branch signal 61, to which no nonlinear operation is required, and thus 26a can be omitted or replaced with a linear buffer. Low-pass filtering the low frequency band signal 36L (at 28a) yields a low-frequency analog signal V1 which can be sampled by A/D converter 20a and processed by the DSP 22 to properly recover low-frequency components of the photodetector signal V. On the other hand, the mid-frequency band signal 36M is preferably filtered by a band pass filter 38, and then supplied to a divider 40 connected to a parallel pair of non-linear processors 26b and 26c, each of which is supplied with a respective mid-frequency branch signal B2 and B3. These mid-frequency branch signals B2, B3 have a common frequency ($f/4$ in the illustrated example) and a phase offset of 90° relative to each other. Low pass filtering (at 28b and 28c) the composite signals output from each of the non-linear processors 26b and 26c yields a pair of low-frequency analog signals V2 and V3 which can be sampled by A/D converters 20b and 20c and processed by the DSP 22 to properly recover mid-frequency components of the photodetector signal V. Similarly, the high-frequency band signal 36H is preferably filtered by a high pass filter 42, and then supplied to a non-linear processor 26d which is supplied with a respective high-frequency branch signal B4 (having a frequency of $f/2$ in the illustrated example). Low pass filtering (at 28d) the output of the non-linear processor 26d yields a low frequency analog signal V4 which can be sampled by A/D converters 20d and processed by the DSP 22 to properly recover high-frequency components of the photodetector signal V.

As may be appreciated, the use of digital branch signals B2-B4 is beneficial in that it enables accurate control of the frequency and phase relationships between the branch signals, and allows the use of samplers or switches as non-linear processors 26. This, in turn, enables the generation of parallel analog signals V1-V4 which, when taken together, contain all of the information content modulated on the photodetector signal V; but which, taken individually, have a lower bandwidth than the photodetector current V. However, as may be appreciated, mixing an analog signal with a digital branch signal tends to generate undesirable harmonics in the mixed signal VBx appearing at the output of the nonlinear processor 26. At least some of these harmonics may lie in the pass-band of the LPFs 28, and so will be "seen" at the inputs of the A/D converters 20. In principal, these harmonics can be characterised mathematically, which means that it is possible to mitigate their effects by suitable processing in the DSP 22. However, this approach may undesirably increase the cost of the DSP 22, since it must be constructed to handle the additional signal processing.

In the illustrated embodiment, undesirable harmonics in the parallel analog signals V1-V4 are avoided by filtering the mid-frequency and high-frequency band signals 36M and 36H using the filters 38 and 42. More particularly, the band-pass filter 38 preferably has a filter characteristic designed to attenuate frequency components of the mid-frequency band signal 36M that, when mixed with second or higher harmonics of the mid frequency branch signals B2 and B3, will produce beat terms lying within the pass band of the low-pass filters 28b and 28c. Similarly, the high-pass filter 42 preferably has a filter characteristic designed to attenuate frequency components of the high-frequency band signal 36H that, when mixed with second or higher harmonics of the high frequency branch signal B4, will produce beat terms lying within the pass band of the low-pass filter 28d.

In the embodiment illustrated in FIGS. 2-3, the frequency domain divider 32 is provided as a triplexer, which outputs three frequency band signals spanning respective portions of the spectral range of the analog input signal 34 from the preamplifier 30. However, the use of a triplexer is not limitative of the resent technique. More generally, the frequency domain divider 32 can be provided as any operative combination of hardware and software that performs a frequency division of the input signal 34 into a set of parallel frequency band signals. For example, the amplified analog signal from the preamplifier may be frequency divided into four frequency band signals comprising a lower frequency band signal, a high frequency band signal, and a pair of mid-frequency band signals, each of which spans a respective different portion of the spectral range of the amplified analog signal. Or, a diplexer could be used to divide the input signal 34 into two frequency bands.

It is generally desirable that the respective spectra of the frequency band signals be internally contiguous, and when concatenated cover a contiguous frequency range. However, this is not essential. For example, a resonant stub could be used to create a periodic "interleaving" function where odd and even spectral bands are interlaced. There could be a gap between spectral bands, or a gap at DC. The bands may not be distinctly separated due to a slow roll-off of the filter causing significant overlap. Alternatively, a steep roll-off could cause a dip or a gap between adjacent spectral bands. Multiple stages of filtering could be used, with or without linear or nonlinear operations between stages.

The embodiments of the invention described above are intended to be illustrative only. The scope of the invention is therefore intended to be limited solely by the scope of the appended claims.

We claim:

1. A frequency decimation block for processing an analog input signal including a high-bandwidth data signal to generate a parallel set of parallel output signals, each output signal representing a respective portion of the high-bandwidth data signal, the frequency decimation block comprising:
 a preamplifier for amplifying the input signal to generate an amplified input signal;
 a frequency domain divider for frequency-dividing the amplified input signal to generate a set of frequency band signals including at least a low frequency band signal, a mid-frequency band signal, and a high frequency band signal, and for supplying each frequency band signal to at least one signal path;
 a respective non-linear processor connected in at least one signal path, each non-linear processor for processing a respective one of the frequency band signals using a respective branch signal to yield a corresponding composite signal; and
 a respective Low-Pass Filter (LPF) connected in each signal path, for low-pass filtering at least the composite signals to generate corresponding ones of the parallel output signals.

2. The frequency decimation block as claimed in claim 1, further comprising a divider for supplying at least the mid-frequency band signal to a respective pair of mid-frequency band signal paths.

3. The frequency decimation block as claimed in claim 2, wherein each mid-frequency band signal path includes a respective one of the non-linear processors, and wherein respective mid-frequency branch signals supplied to each non-linear processor have a common frequency and a 90° phase offset relative to each other.

4. The frequency decimation block as claimed in claim 3, wherein the mid-frequency branch signals are digital signals, and wherein the frequency decimation block further comprises a band-pass filter connected between the frequency domain divider and the divider for band-pass filtering the mid-frequency band signal using a filter characteristic selected to attenuate frequency components of the mid-frequency band signal that will mix with harmonics of the respective branch signals to produce beat terms lying within a pass-band of the respective Low-Pass Filters.

5. The frequency decimation block as claimed in claim 1, wherein a high-frequency band signal path includes respective one of the non-linear processors for mixing the high-frequency band signal with a respective high-frequency branch signal.

6. The frequency decimation block as claimed in claim 5, wherein the high-frequency branch signal is a digital signal, and wherein the frequency decimation block further comprises a high-pass filter connected between the frequency domain divider and the respective non-linear processor for high-pass filtering the high-frequency band signal using a filter characteristic selected to attenuate frequency components of the high-frequency band signal that will mix with harmonics of the high-frequency branch signal to produce beat terms lying within a pass-band of the respective Low-Pass Filters.

7. The frequency decimation block as claimed in claim 1, wherein each non-linear processor comprises a mixer for mixing its respective frequency band signal with the respective branch signal.

8. The frequency decimation block as claimed in claim 1, wherein each non-linear processor comprises a sampler for sampling its respective frequency band signal at a timing of the respective branch signal.

9. The frequency decimation block as claimed in claim 1, wherein each non-linear processor comprises a switch for switching its respective frequency band signal at a timing of the respective branch signal.

10. In an optical communications network, a network node comprising the frequency decimation block as claimed in claim 1.

11. A method for processing an analog input signal including a high-bandwidth data signal to generate a parallel set of parallel output signals, each output signal representing a respective portion of the high-bandwidth data signal, the method comprising:
 amplifying the input signal to generate an amplified input signal;

frequency-dividing the amplified input signal to generate a set of frequency band signals including at least a low frequency band signal, a mid-frequency band signal, and a high frequency band signal, and for supplying each frequency band signal to at least one signal path;

processing a respective one of the frequency band signals using a respective branch signal to yield a corresponding composite signal; and low-pass filtering at least the composite signals to generate corresponding ones of the parallel output signals.

12. The method as claimed in claim 11, further comprising supplying at least the mid-frequency band signal to a respective pair of mid-frequency band signal paths.

13. The method as claimed in claim 12, wherein respective mid-frequency branch signals have a common frequency and a 90° phase offset relative to each other.

14. The method as claimed in claim 13, wherein the mid-frequency branch signals are digital signals, and wherein the method further comprises band-pass filtering the mid-frequency band signal using a filter characteristic selected to attenuate frequency components of the mid-frequency band signal that will mix with harmonics of the respective branch signals to produce beat terms lying within a pass-band of the respective Low-Pass Filters.

15. The method as claimed in claim 11, further comprising high-pass filtering the high-frequency band signal using a filter characteristic selected to attenuate frequency components of the high-frequency band signal that will mix with harmonics of the high-frequency branch signal to produce beat terms lying within a pass-band of respective Low-Pass Filters.

16. The method as claimed in claim 11, wherein each non-linear processor comprises a mixer for mixing its respective frequency band signal with the respective branch signal.

17. The method as claimed in claim 11, wherein each non-linear processor comprises a sampler for sampling its respective frequency band signal at a timing of the respective branch signal.

18. The method as claimed in claim 11, wherein each non-linear processor comprises a switch for switching its respective frequency band signal at a timing of the respective branch signal.

* * * * *